United States Patent [19]
Phipps et al.

[11] Patent Number: 6,063,894
[45] Date of Patent: May 16, 2000

[54] PROCESS FOR PURIFYING POLYMERS USING ULTRASONIC EXTRACTION

[75] Inventors: Lloyd Myles Phipps, Shelton; Eric J. Swenson, Olympia, both of Wash.

[73] Assignee: Advanced Polymer Technologies, L.L.C., Cambridge, Mass.

[21] Appl. No.: 09/168,985

[22] Filed: Oct. 9, 1998

Related U.S. Application Data

[60] Provisional application No. 60/061,930, Oct. 17, 1997.

[51] Int. Cl.$^7$ .................................................. C08G 64/00
[52] U.S. Cl. .......................... 528/196; 528/176; 528/232; 528/271
[58] Field of Search .................... 528/176, 196, 528/232, 271

[56] References Cited

U.S. PATENT DOCUMENTS

| | | | |
|---|---|---|---|
| 3,112,188 | 11/1963 | Weller | 280/6 |
| 3,245,964 | 4/1966 | Wiesner et al. | 260/78 |
| 3,266,165 | 8/1966 | Apostle et al. | 34/28 |
| 3,373,145 | 3/1968 | Wagner | 260/78 |

FOREIGN PATENT DOCUMENTS

| | | |
|---|---|---|
| 0 293 090 A2 | 11/1988 | European Pat. Off. . |
| 0 435 212 A1 | 7/1991 | European Pat. Off. . |
| 0 716 044 A1 | 6/1996 | European Pat. Off. . |
| 2 551 223 | 3/1985 | France . |

OTHER PUBLICATIONS

Database WPI, Section Ch, Week 8710, JP 62 019247 A, "Desorption of Colloid from Ion Exchanger—by Treating with Acidic Solution and Specified Ultrasonic Frequency," Jan. 28, 1987.

Database WPI, Section Ch, Week 9118, JP 03 065225 A, "Hydrophilic Porous Polyolefin Membranes for Water Treatment, etc.—in which part of Pore Surface is Coated with Polymers Comprising Hydroxyethyl (meth)acrylate!" Mar. 20, 1991.

P. Greguss et al., "Acoustic Method for the Post–Treatment of Fibres." Proc. 1st International Symposium High Power Ultrasonics, pp. 154–156 (1966).

*Primary Examiner*—Terressa M. Boykin
*Attorney, Agent, or Firm*—Morgan, Lewis & Bockius LLP

[57] ABSTRACT

A process for purifying a substantially unoriented polymer containing an impurity by means of ultrasonic leaching or extraction is described. The process involves contacting a substantially unoriented polymer containing an impurity with a cavitatable liquid, subjecting the substantially unoriented polymer containing an impurity in contact with a cavitatable liquid to ultrasonic radiation at a frequency and intensity sufficient to extract the impurity from the substantially unoriented polymer to form a purified substantially unoriented polymer, and then separating the purified substantially unoriented polymer from the cavitatable liquid containing the extracted impurity. A purified substantially unoriented polymer prepared by such a method is also described.

31 Claims, 14 Drawing Sheets

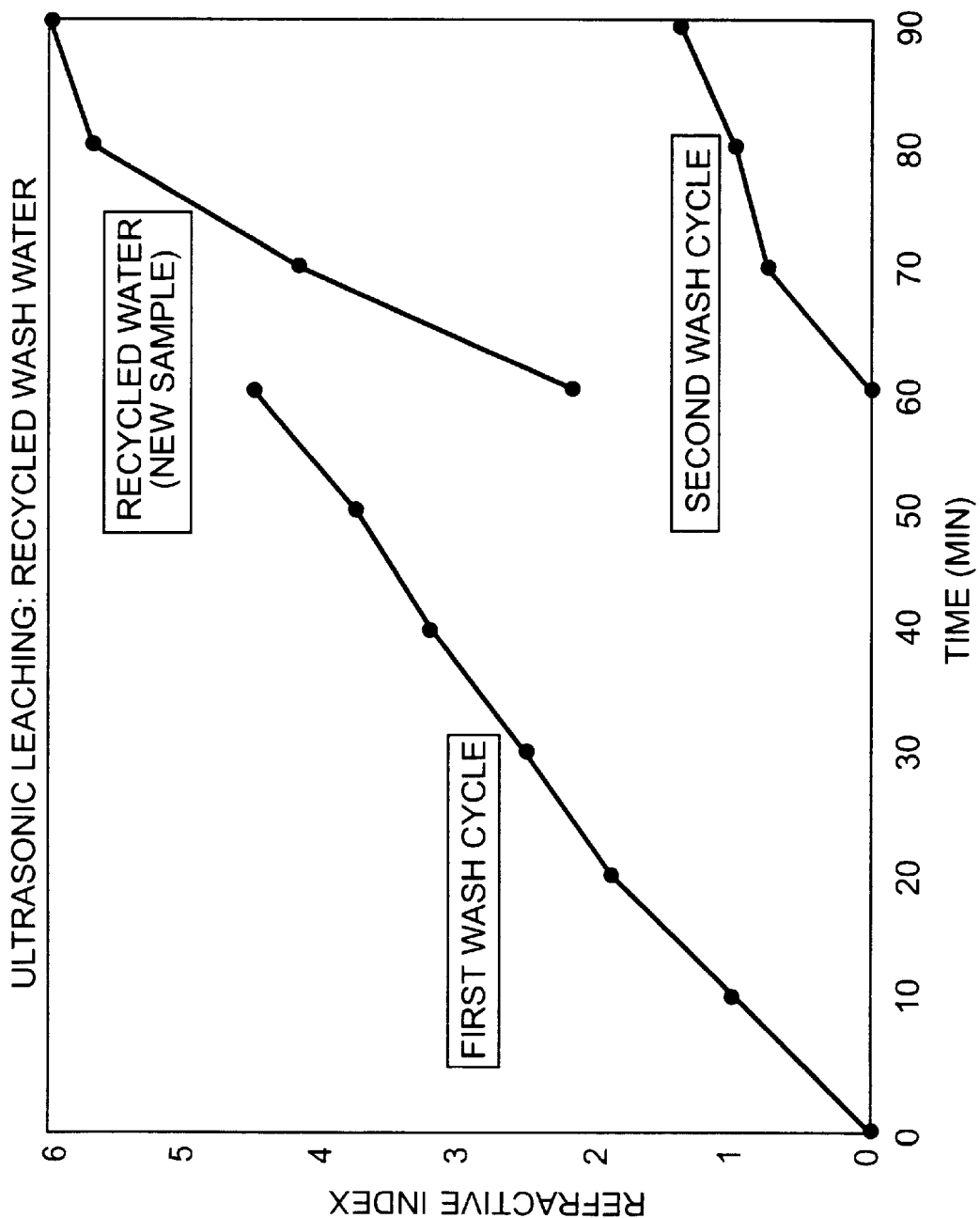

6,063,894

PROCESS FOR PURIFYING POLYMERS USING ULTRASONIC EXTRACTION

PRIORITY DATA

This application claims benefit under 35 U.S.C. §119 of provisional application Ser. No. 60/061,930 filed Oct. 17, 1997. The entire disclosure of the provisional application is incorporated herein by reference.

FIELD OF THE INVENTION

The invention relates to a process for purifying substantially unoriented polymers containing an impurity through the use of ultrasonic leaching or extraction.

BACKGROUND OF THE INVENTION

Synthetic polymers have a wide variety of commercial applications. For example, synthetic polymers are used in the production of polymer end products such as plastics, films, fibers, adhesives, paints, and the like.

Conventional polymerization processes produce synthetic polymers containing impurities such as, by-products, unreacted monomers, oligomers, catalysts, chain-length control agents, and the like. Such polymer impurities often impair or damage the machinery used to process the polymer. In addition, as the polymer is processed, impurities in a polymer act as a source of pollution and thus a safety hazard to those operating the processing machinery. Furthermore such impurities adversely effect the properties of the polymer and, as a result, the properties of the polymer end products. For example, the presence of unreacted monomers can cause the polymer to be sticky or weak and consequently creates problems when processing the polymer into films or fibers. Accordingly, in order to optimize the properties of the polymer end products, it is desirable to use a synthetic polymer that contains no impurities or as few impurities as possible.

The removal of impurities remaining after polymerization from a synthesized polymer is generally achieved by washing or extracting the polymer with a solvent, such as water. For example, U.S. Pat. Nos. 3,245,964 and 3,373,145 describe processes for extracting water-soluble impurities from polymer chips or pellets by washing the polymer chips or pellets with water. The resulting leachate, i.e., the leaching solvent now containing the impurity, is then removed from the polymer. However, such leaching processes require continuous and prolonged contact (e.g., more than 20 hours per polymer batch) of the leaching solvent, in this case water, with the polymer to achieve sufficient removal of impurities. Such treatments are not only time consuming and costly but inconsistent, frequently leading to variations among the polymer batches obtained. Moreover, prolonged exposure of the polymer to the aqueous leaching solvent can lead to deterioration of the polymer. Consequently, the appearance of the polymer and/or the mechanical properties of the polymer and polymer end products are adversely effected.

Ultrasound has been used for the removal of residual monomer from oriented polymer fibres formed from a precursor polymer. P. Greguss et al., *Acoustic Method for the Post-treatment of Fibres,* 1st International Symposium High Power Ultrasonics, p. 154 (1966). According to such a method, ultrasound is applied after fibre formation to remove any residual monomer content. Thus, the method is used as a post-treatment method of processed oriented polymers.

Accordingly, there still exists a need in the art for an effective and efficient method for the removal of impurities present in substantially unoriented polymers. The invention answers this need.

SUMMARY OF THE INVENTION

It has been discovered that when a substantially unoriented polymer containing impurities is contacted with a cavitatable liquid in the presence of ultrasonic energy, impurities can be removed from the substantially unoriented polymer at a significantly increased rate and thus with greater efficacy. Accordingly, the invention relates to a process for purifying a substantially unoriented polymer containing an impurity. The process involves contacting a substantially unoriented polymer containing an impurity with a cavitatable liquid, subjecting the substantially unoriented polymer containing an impurity in contact with the cavitatable liquid to ultrasonic radiation at a frequency and intensity sufficient to extract an impurity from the polymer, and then separating the purified substantially unoriented polymer from the cavitatable liquid containing the extracted impurity. The invention further relates to a purified substantially unoriented polymer prepared by a process of the invention.

Additional objects and advantages of the invention are discussed in the detailed description which follows, and will be obvious from that description, or may be learned by practice of the invention. It is to be understood that both this summary and the following detailed description are exemplary and explanatory only and are not intended to restrict the invention.

BRIEF DESCRIPTION OF THE FIGURES

FIG. 14 illustrates the results of ultrasonic leaching using recycled cavitatable liquid (Example 11).

DETAILED DESCRIPTION OF THE INVENTION

Figure 1:
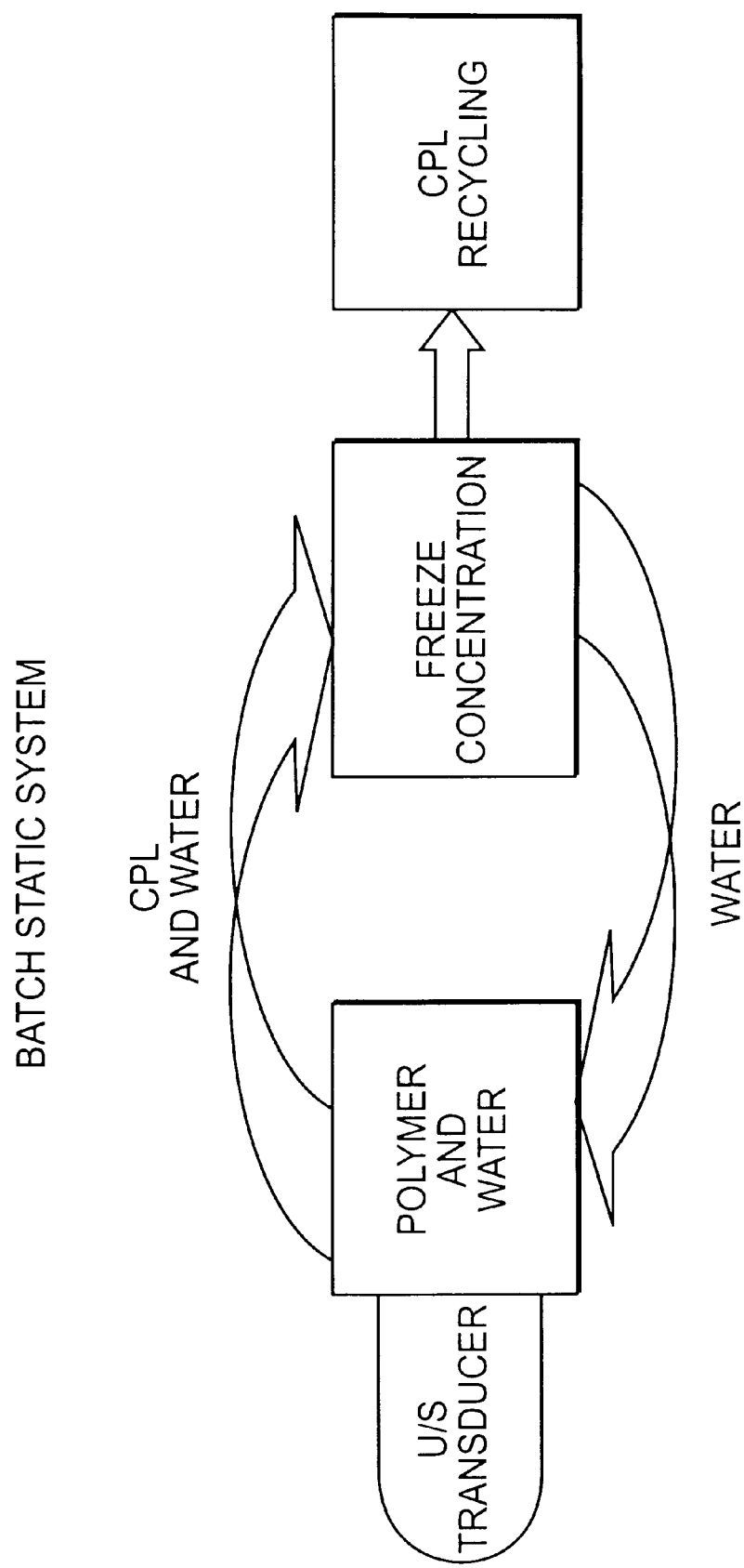
FIG. 1 is a flow diagram of the basic steps of a batch polymer process to which an ultrasonic static leaching process of the invention is applied.

The invention relates to a process for purifying a substantially unoriented polymer containing an impurity. A process of the invention involves contacting a substantially unoriented polymer containing an impurity with a cavitatable liquid, subjecting the polymer in contact with the cavitatable liquid to ultrasonic radiation at a frequency and intensity sufficient to extract an impurity from the polymer, and then separating the purified substantially unoriented polymer from the cavitatable liquid containing the extracted impurity. According to the invention, the combined use of a cavitatable liquid and ultrasonic radiation allows for the removal of impurities from the polymer at a significantly increased rate and thus with greater efficacy as to, for example, throughput time and economic costs. With the increased rate of removal, problems such as, for example, polymer degradation and discoloration can be avoided.

The Substantially Unoriented Polymer

A process according to the invention ("ultrasonic leaching/extraction") may be used to extract impurities from any substantially unoriented polymer which contains an impurity. In the context of the invention, the term "substantially unoriented polymer" refers to any polymer that has not been processed, ie., a polymer which lacks substantial orientation of the crystallite regions along the axis of the polymer fiber or is amorphous as described below. The degree of orientation may be determined by techniques such as, for example, x-ray crystallography as well as other methods as understood by those of skill in the art. The "substantially unoriented polymer", as described above, may be in the form of, for example, pre-processed polymer pellets, chips, fibers and sheets. The substantially unoriented polymer may be prepared by any known polymerization process such as continuous or batch polymer polymerization processes as known in the art.

The substantially unoriented polymer to which an ultrasonic leaching/extraction of the invention is applied may be a homopolymer or a copolymer derived from two or more different monomers. The monomer ratio of the copolymer may range from 1:1 to where one monomer is in excess. Preferably, a substantially unoriented polymer is a condensation polymer or a polyolefin in the form resulting from polymerization and prior to any processing (e.g., compounding; addition of fillers, plasticizers, modifiers; drawing of the polymer; stretching of the polymer; formation of polymer alloy) for subsequent use, each as recognized by those of skill in the art.

A pre-processed condensation polymer may be any of those known in the art including, but not limited to, a polyamide, a polyimide, a polyester, a polyurethane, a polyurea, a polyanhydride, a polycarbonate, a polysulfide and a polysilicone. A pre-processed polyolefin may include those known in the art such as, for example, a polyethylene, a polypropylene, a polystyrene, a polyvinyl chloride, a polyvinyl acetate, and a polyvinyl alcohol. Preferably, the substantially unoriented polymer is a pre-processed polyamide, polyester, polycarbonate, or polyolefin. More preferably, the substantially unoriented polymer is a polyamide including, but not limited to, poly[imino(1-oxo-1,6-hexanediyl)] (i.e., polycaprolactam or PA-6), poly[imino(1,6-dioxo-1,6-hexanediyl)imino-1,6-hexanediyl] (i.e., poly(hexamethylene adipamide or PA-66), poly[imino-1,6-hexanediylimino(1,12-dioxo-1,12-dodecanediyl)] (i.e., poly(hexamethylene dodecanoamide or PA-612) and mixtures thereof. Most preferably, the substantially unoriented polymer is poly[imino(1-oxo-1,6-hexanediyl)].

The impurity may be any impurity or impurities found in the reactant monomer(s) or resulting from the polymerization process that can be removed by action of a cavitatable liquid subjected to ultrasonic radiation. The impurity may be soluble or insoluble (e.g., as a suspension or as a colloidal solution) in the cavitatable liquid, as described below. Preferably, the impurity is soluble in the cavitatable liquid. Examples of such impurities or undesirable residues include, but are not limited to, unreacted monomers, oligomer by-products (e.g., dimers, trimers), catalysts, chain-growth initiators, chain-length control agents, end-group reactants for chain termination, and the like. For example, the polyamide PA-6 is prepared by the polymerization of caprolactam. In the polymerization process, caprolactam is first hydrolyzed to 6-aminohexanoic acid. The monomer is then heated to achieve condensation and hence polymerization. The resulting polyamide PA-6 typically contains impurities of a certain amount of unreacted caprolactam and low molecular weight water-soluble oligomers. These impurities can be removed from the polymer by the combined use of a cavitatable liquid and ultrasonic radiation applied at a frequency and intensity sufficient to leach or extract the undesired impurities of caprolactam and oligomers without detriment to the polymer.

The Cavitatable Liquid

Figure 2:
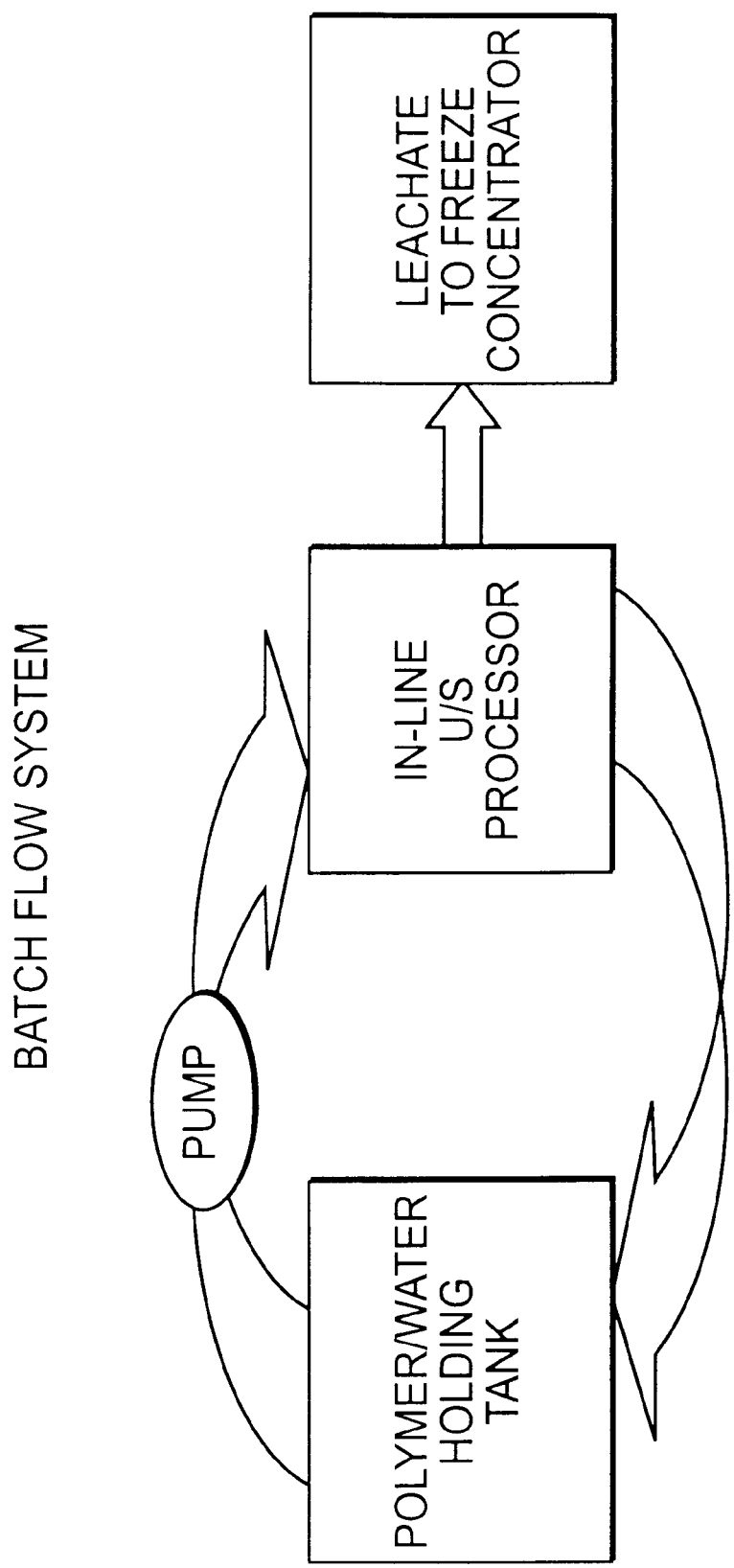
FIG. 2 is a flow diagram of the basic steps of a batch polymer process to which an ultrasonic flow-based leaching process of the invention is applied.
Figure 3:
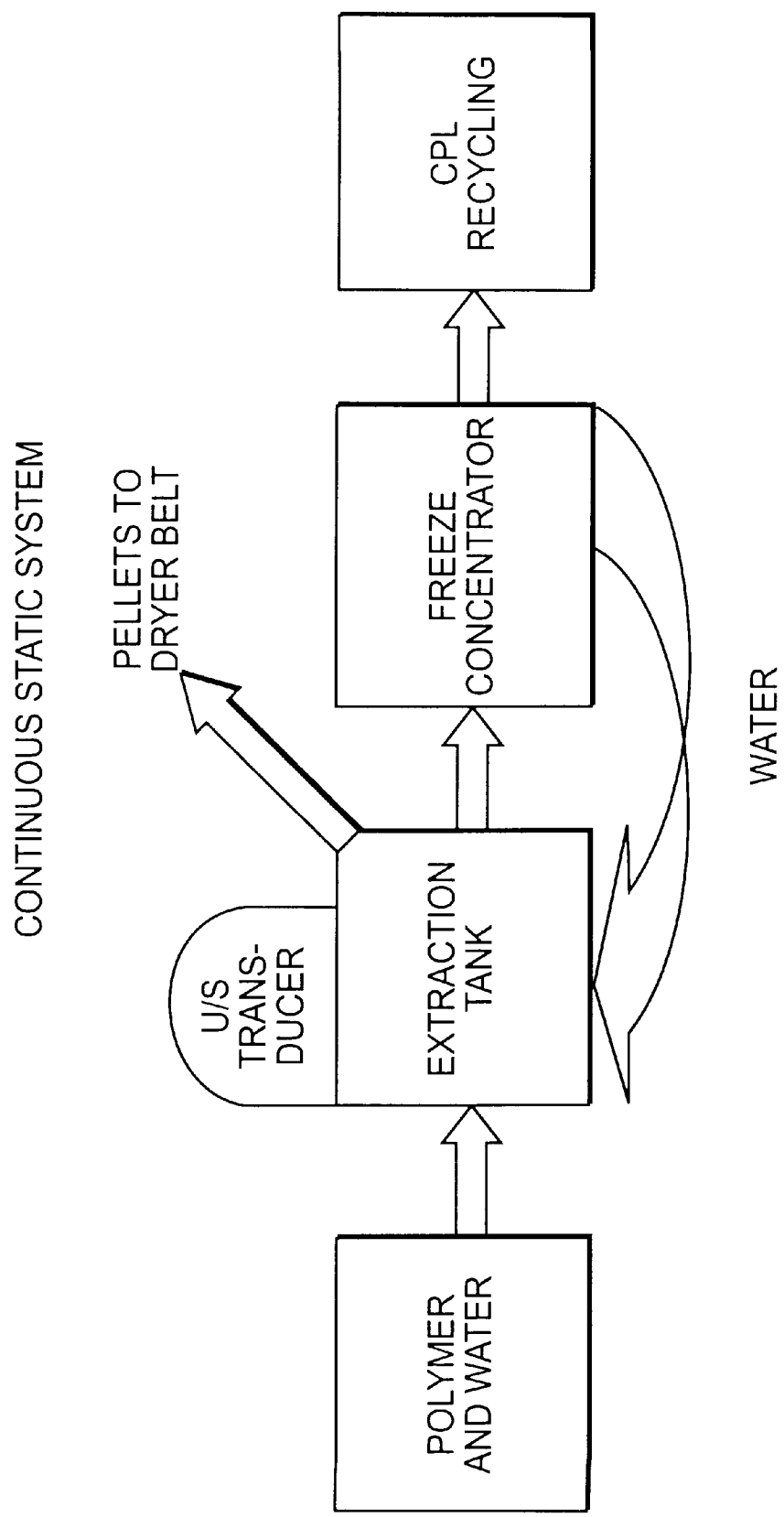
FIG. 3 is a flow diagram of the basic steps of a continuous polymer process to which an ultrasonic static leaching process of the invention is applied.
Figure 4:
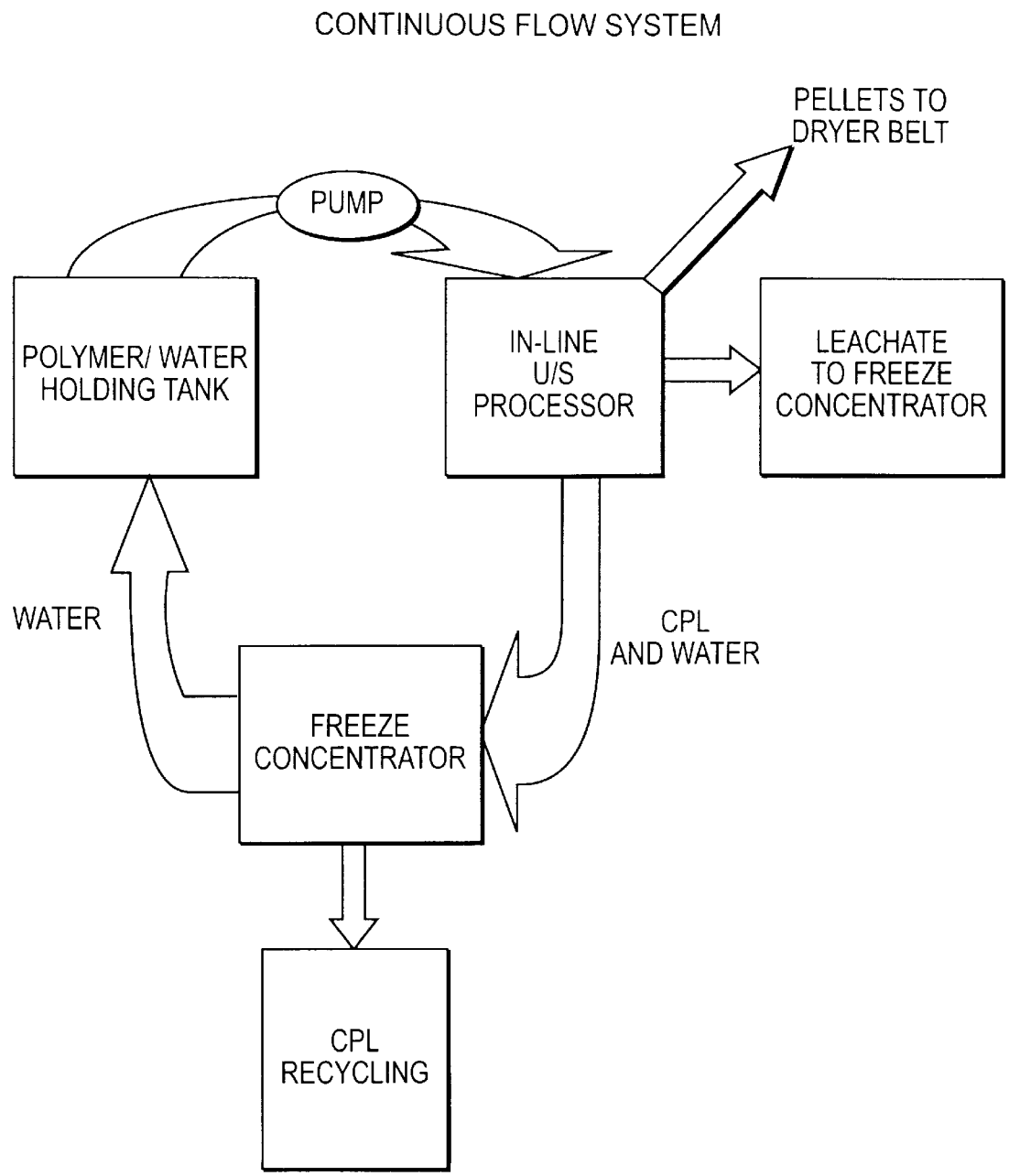
FIG. 4 is a flow diagram of the basic steps of a continuous polymer process to which an ultrasonic flow-based leaching process of the invention is applied.

The term "cavitatable liquid" as used in the context of the invention refers to any liquid capable of cavitation, i.e., formation of vapor bubbles when subjected to a force or energy such as ultrasonic energy, and capable of removing soluble and/or insoluble impurities or undesired residues found in the substantially unoriented polymer without adversely effecting the polymer itself. The cavitatable liquid to which ultrasonic radiation is applied may be substantially static and free-standing (i.e., tank based) or substantially dynamic and flowing (i.e., flow or current based). FIGS. 1 and 2 illustrate a static system and a flow based system, respectively, each as applied to a substantially unoriented polymer produced by means of a batch polymer process. In FIG. 1, the polymer is polycaprolactam and is placed in a tank filled with the cavitatable liquid water. The water is non-flowing and thus is considered static. The polycaprolactam and water system is then subjected to ultrasonic radiation for removal of caprolactam (CPL) impurity. The cavitatable liquid containing the CPL impurity may then be subjected to freeze concentration or crystallization, as described below, to separate, collect and reuse both the CPL and the water. In FIG. 2, the polymer is polycaprolactam and is placed in a streaming flow of the cavitatable liquid water to which ultrasonic radiation is applied for removal of caprolactam (CPL) impurity. The water is free-flowing and thus is considered a flow system. If desired, the cavitatable liquid containing CPL may be removed and treated to separate, collect and reuse both the CPL and the water. FIGS. 3 and 4 illustrate a static system and a flow based system, respectively, each as applied to a substantially unoriented polymer produced by means of a continuous polymer process. In FIG. 3, a polycaprolactam polymer is placed in a tank filled with the cavitatable liquid water where the water is static or non-flowing. The polycaprolactam and water system is then subjected to ultrasonic radiation for removal of caprolactam (CPL) impurity. The cavitatable liquid containing the CPL impurity may then be subjected to freeze concentration or crystallization, as described below, to separate, collect and reuse both the CPL and the water. In FIG. 4, the polymer is polycaprolactam and is placed in a streaming flow of the cavitatable liquid water to which ultrasonic radiation is applied for removal of caprolactam (CPL) impurity. The water is free-flowing and thus is considered a flow system. If desired, the cavitatable liquid containing CPL may be removed and treated to separate, collect and reuse both the CPL and the water. The amount of cavitatable liquid used will depend on the amount of polymer to be treated. Generally, a minimal amount of cavitatable liquid is used to maintain levels of residual cavitatable liquid in the purified polymer as low as possible. Preferably, the ratio of cavitatable liquid to polymer is about 3:1, more preferably, about 1:1, and most preferably about 0.5:1.

Suitable cavitatable liquids include, for example, water, alcohols, ketones, esters, ethers, dimethyl sulfoxide (DMSO), aliphatic or aromatic hydrocarbons (e.g., benzene, toluene, heptane), supercritical fluids (e.g., carbon dioxide, propane), liquids that are solid at room temperature but liquid at temperatures at which ultrasonic leaching/extraction is conducted (e.g., cyclohexanol, glacial acetic acid, naphthalene), and mixtures thereof. The selection of the cavitatable liquid useful in the process of the invention is governed by the nature of the substantially unoriented polymer and the type of impurity to be removed from the polymer. The choice of cavitatable liquid may also be determined by the boiling point of the liquid. As described below, the boiling point of the cavitatable liquid may act as the upper limit as to the temperature at which a process of the invention is conducted. In a preferred embodiment, the cavitatable liquid is water. The cavitatable liquid may further contain other additives as recognized by those of skill in the art such as, for example, surfactants, wetting agents, antifoaming agents, vapor pressure/boiling point modifiers (e.g. methanol) and mixtures thereof.

The amount of force or energy required to achieve cavitation will depend upon the nature or cavitation behavior of the cavitatable liquid. Factors influencing the cavitation behavior of liquids include, for example, viscosity and volatility of the liquid. For example, if the boiling point of the cavitatable liquid at atmospheric pressure is too low, the cavitation bubbles produced will rapidly fill with vapor and collapse without much energy which in turn will reduce the effectiveness of ultrasonic leaching/extraction process. Preferably, the cavitatable liquid useful in the ultrasonic leaching/extraction process of the invention has a boiling point of not less than about 50° C. at atmospheric pressure, more preferably, not less than about 80° C. at atmospheric pressure. Cavitatable liquids having lower boiling points may be used when the ultrasonic leaching/extraction process is conducted at temperatures significantly lower than the boiling point of the cavitatable liquid or at pressures higher than atmospheric pressure.

The viscosity of the cavitatable liquid may also influence the cavitation behavior of the cavitatable liquid in that the higher the viscosity of the cavitatable liquid, the greater the force or energy needed to cause cavitation. Accordingly, the viscosity of the cavitatable liquid may be any viscosity as long as cavitation bubble formation is possible. According to the invention, the viscosity of the cavitatable liquid is about 0–10,000 centipoise units (cps). Preferably, the viscosity of the cavitatable liquid is below about 5000 centipoise units (cps), more preferably below about 1000 cps, and most preferably below about 500 cps. Cavitatable liquids having a viscosity above about 5000 cps may be used in the process of the invention, however, as discussed above, a greater applied force or energy may be needed.

Ultrasonic Radiation

According to the invention, cavitation of the cavitatable liquid may be induced by the application of ultrasonic radiation. In a process of the invention, a substantially unoriented polymer containing an impurity is contacted with a cavitatable liquid and subjected to ultrasonic radiation at a frequency and intensity sufficient to extract an impurity from the substantially unoriented polymer. As discussed above, the application of ultrasonic radiation or energy induces the formation of sonic cavitation bubbles in the cavitatable liquid. The implosion of the cavitation bubbles generates "shock waves" which drive the cavitatable liquid into the surface of the substantially unoriented polymer and thereby accelerates the removal of polymer impurities, i.e., the leachant, from within or at the surface or near-surface of the polymer. Implosion or collapse of the cavitation bubbles also results in "sonic streaming" of the cavitatable liquid which also facilitates removal of the leachant from the substantially unoriented polymer.

According to the invention, the frequency and intensity of the ultrasonic radiation is sufficient to extract an impurity from a substantially unoriented polymer containing an impurity. Preferably, the ultrasonic radiation has a frequency ranging from about 15 to about 100 KHz, more preferably from about 20 to about 40 KHz, and most preferably about 20 KHz. One of ordinary skill in the art would recognize that the frequency of the ultrasonic radiation used in an ultrasonic leaching/extraction process of the invention may vary and be adjusted according to the nature of the substantially unoriented polymer and the cavitatable liquid and the type of impurity to be removed from the polymer. Preferably, the intensity of the ultrasonic radiation is as described below.

The source of ultrasonic radiation may be any ultrasonic generator known in the art. In a preferred embodiment, the source of ultrasonic radiation is a transducer. Examples of suitable transducers include, but are not limited to, piezoelectric (e.g., quartz, cast polyvinylidene diflouride sold under the trade name of KYNAR available from Measurement Specialities, Valley Forge, Pa., piezoceramic) or inverse piezoelectric effect devices and magnetostrictive devices. The transducer may be used in conjunction with a standard sonic horn. The sonic horn may be, but not limited to, steel, ceramic tipped, or titanium. Preferably the sonic horn is a titanium horn. In another preferred embodiment, an electrical or mechanical system may be used to achieve the desired ultrasonic frequency such as, for example, an ultrasonic whistle. Examples of ultrasonic generators useful in the process of the invention include Sonics and Material models VC-1500, VC50, and VC600 or ARTEK Systems Corp. Model 150 and those available from Branson Ultrasonics, Danbury, Conn.

The ultrasonic radiation may be applied continuously or intermittently (i.e., pulse) to the cavitatable liquid. The ultrasonic radiation may also be applied directly or indirectly to the cavitatable liquid. Direct application of ultrasonic radiation is defined in the context of the invention as a system in which the cavitatable liquid to which the ultrasonic radiation is applied is in direct contact with the substantially unoriented polymer. Indirect application of ultrasonic radiation is defined in the context of the invention as a system in which the cavitatable liquid to which the ultrasonic radiation is applied is in direct contact with an ultrasonic permeable barrier (e.g., glass, pyrex) which in turn is in contact with a same or different cavitatable liquid in contact with a substantially unoriented polymer.

Figure 5:
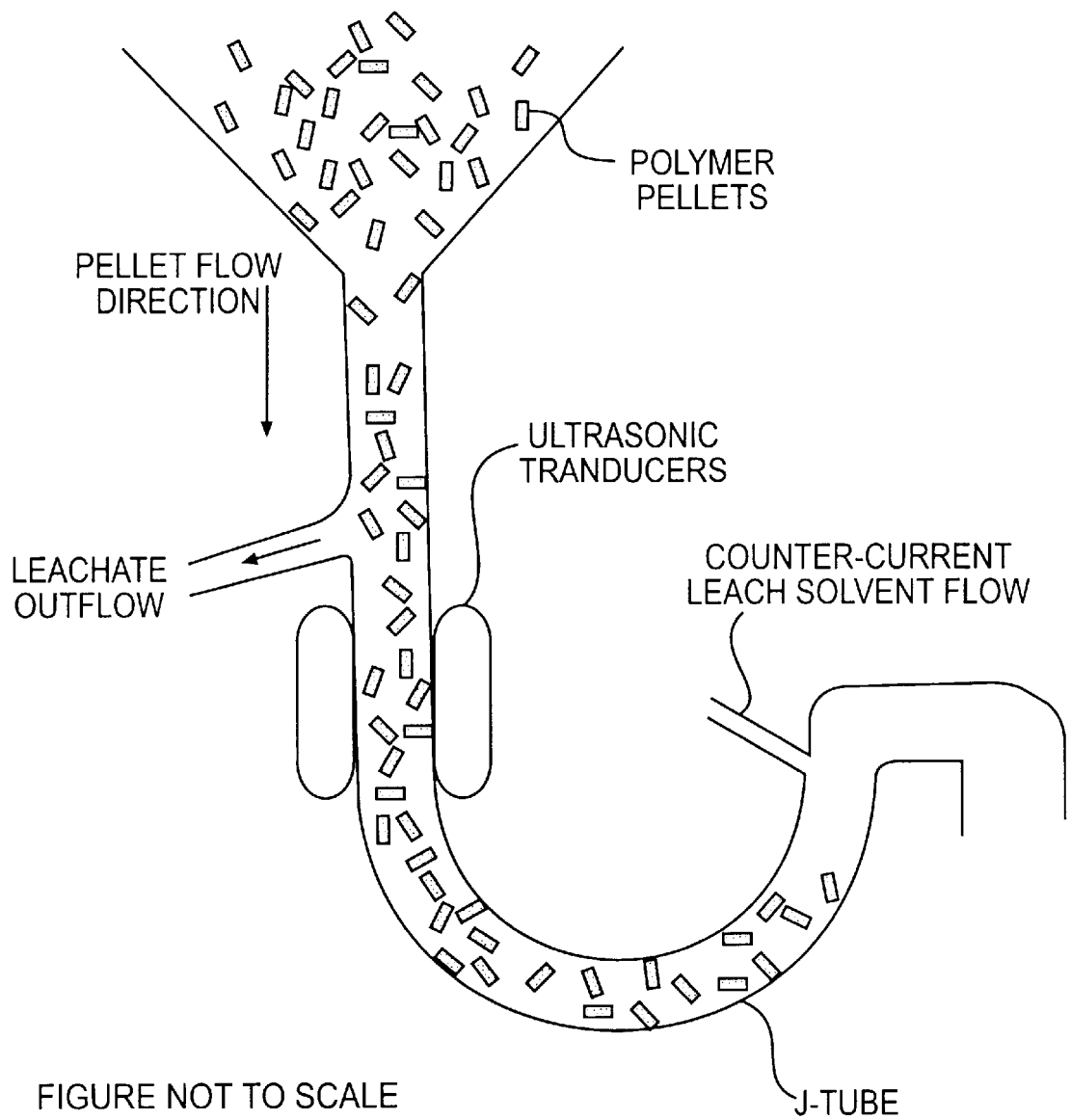
FIG. 5 illustrates an embodiment of the invention wherein the ultrasonic radiation is applied indirectly to polymer pellets through the use of externally mounted ultrasonic transducers.

For example, ultrasonic radiation may be applied directly to the cavitatable liquid in contact with a substantially unoriented polymer containing an impurity by means of at least one ultrasonic generator together with a standard titanium horn. One example of indirect application of ultrasonic radiation is illustrated in FIG. 5. As shown in FIG. 5, polymer pellets are released from a pelletizer, suspended in a cavitatable liquid and then sent through a J-tube. A cavitatable liquid surrounding the J-tube containing the polymer pellets in a cavitatable liquid is subjected to ultrasonic radiation by means of externally mounted transducers.

The Rate of Leaching/Extraction

As described above, an ultrasonic leaching/extraction process according to the invention leaches out or extracts impurities at a significantly increased rate by applying ultrasonic radiation to a cavitatable liquid in contact, directly or indirectly, with a substantially unoriented polymer. At a given temperature, intensity and power, a process of the invention, when compared to existing processes, is able to leach out or extract impurities from a substantially unoriented polymer to the same or greater degree in a substantially reduced time. Preferably, the time savings for leaching out or extracting the impurities is 50% or better compared to existing processes. Depending upon the nature of the polymer, the cavitatable liquid and the impurity or leachant to be removed, the frequency of ultrasonic radiation may be adjusted accordingly. Likewise, the increased rate of leaching or extraction may also be achieved by adjusting the parameters of temperature, intensity of the sonic energy as well as power of the sonic energy. One of skill in the art would recognize that such parameters could easily be determined by routine experimentation.

Generally, the temperature at which an ultrasonic leaching/extraction process of the invention is conducted should be as high as possible but not so high as to adversely effect the polymer. For example, if the temperature is too high, undesired side reactions of polymer oxidation, degradation, carbonization, hydrolysis, and undesired cross-linking may occur. In a preferred embodiment of the invention, the temperature at which an ultrasonic leaching/extraction process of the invention is conducted ranges from about 35° C. to about 180° C., more preferably from about 80° C. to about 95° C., at atmospheric pressure. As discussed above, a temperature close to the boiling point of the cavitatable liquid may reduce the leaching effect of the cavitation bubbles. Preferably, the pressure at which the leaching step is conducted ranges from about 1 atm to about 5 atm. At higher pressures, the upper limit of the boiling point of the cavitatable liquid may be raised.

The rate of ultrasonic leaching/extraction generally increases with increases in intensity of the ultrasonic radiation. Preferably, the ultrasonic radiation is applied at an intensity ranging from about 1 W/cm$^2$ to about 500 W/cm$^2$, more preferably from about 5 W/cm$^2$ to about 250 W/cm$^2$. Likewise, rate of leaching/extraction may be increased by an increase in power of the ultrasonic radiation source. In a preferred embodiment, the power ranges from about 500 watts to about 3000 watts.

The duration of the leaching step may vary widely depending on the type of polymer, impurities and cavitatable liquid. Generally, leaching is conducted until greater than about 99% of leachant is removed. The amount of leachant or impurities removed from the substantially unoriented polymer may be measured by any means recognized by those of skill in the art. In a preferred embodiment, the amount of leachant removed is measured in terms of the index of refraction of the polymer purified by a process of the invention. The index of refraction may be measured according to the Brix scale which may be calibrated or recalibrated as necessary according to polymer type being purified. By using index of refraction measurements to monitor rate of extraction, the purified polymer need not be dried as would be necessary in other measurement techniques such as infrared spectroscopy. The amount of leachant removed may also be determined by measurements to the cavitatable liquid itself by, for example, high performance liquid chromatography (HPLC) and evaporation and/or distillation of the cavitatable liquid and measurement of amount of residual leachant.

The Separation Step

According to a process of the invention, once the leaching/extraction step is complete, the purified polymer is separated from the cavitatable liquid containing the extracted impurity, i.e., the leachate. Separation of the purified polymer from the leachate may be achieved by conventional solid-liquid separation techniques including, but not limited to, gravity filtration, cross-flow filtration, vacuum or fractional distillation, chromatography, centrifugation, membrane separation (e.g., reverse osmosis), and evaporation. Preferably, a purified substantially unoriented polymer contains less than about 5%, more preferably less than about 0.1–1% residual impurity based on the total weight of the substantially unoriented polymer. For example, if the substantially unoriented polymer is polycaprolactam, the purified polycaprolactam contains less than about 5%, more preferably less than about 0.1–1% residual caprolactam monomer based on the total weight of the polycaprolactam.

The Drying Step

The separated, purified polymer may contain residual cavitatable liquid. Accordingly, the purified substantially unoriented polymer may be dried to substantially remove any residual cavitatable liquid retained by the polymer. The drying step may be accomplished by techniques known in the art, as disclosed, for example, in U.S. Pat. Nos. 3,112,118 and 3,266,165, the disclosures of which are herein incorporated by reference.

Although conventional drying techniques can be used in the process of the invention, they are not preferred because they can be time consuming and difficult to control. Preferably, low frequency radio frequency ("RF") energy is used to substantially and uniformly remove any cavitatable liquid retained in a polymer purified by an ultrasonic leaching/extraction process of the invention without overheating or destroying the polymer or fostering polymer runaway.

RF energy useful for heating is considered to be that portion of the electromagnetic spectrum lying at frequencies directly below the microwave (MW) band and higher than approximately 1 MHZ. Preferably, the RF frequency is less than about 600 MHZ, more preferably, about 1–300 MHZ, most preferably, about 1–100 MHZ. Radio waves below about 1 MHz certainly do exist but are not considered useful for heating purposes. RF heating, also sometimes called dielectric heating, is generally considered to be more useful in large industrial applications, where large volumes of material must be heated.

In another preferred embodiment, the drying step is achieved using a combination of RF and microwave (MW) energy. The use of MW, i.e., frequencies lower than infrared and higher than about 600 MHz. In that case, the microwave is able to provide excitations that causes a specific change, for example, the heating of water to the exclusion of heating of other surrounding materials. This allows microwave heating to be more efficient than RF heating in certain applications. For example, in cooking, microwave energy can heat only the water in food, allowing the heat transfer from the water to heat the surrounding food materials but not necessarily the pan, the oven itself, etc. Thus energy that is wasted when ordinary thermal heating is used can be saved.

Thus, according to the invention, to substantially dry a sample of purified substantially unoriented polymer, the basic heating of the entire body is provided at lower cost by RF. In this way, the entire volume of polymer will reach a "background temperature" (BT) quickly and at low cost. For example, an RF oven at low voltage and low power (Oven Frequency of 37.5 MHZ; duty cycle of 42%, oven power of 10 kW) used to heat 40 lbs of nylon polymer chips (polymer bed depth=10 cm) to 128° C. from room temperature in 1.5 hour is being operated in such a way as to provide a much more moderate heating rate than is possible while avoiding subsidiary effects such as, for example, chain shortening. Once the BT is reached, the RF power level can be reduced or eliminated entirely. Simultaneously, MW radiation can be started. The water is thus selectively heated. The laws of thermodynamics provide that there will be no net heat flow between two objects that are at the same temperature. Thus since the RF-heated material (polymer and cavitatable liquid of water) has been raised to near the boiling point, the water can be heated selectively and escape the system. The only energy derived from the MW heating is that of the heat of vaporization of the water. Since water will constitute only a small fraction of the total weight of the wet polymer, the MW energy can be quite small. In this case, the water content of the polymer is approximately 8%, or a total weight of water of 1452 grams. The energy needed to evaporate that amount of water is 784 kcal, or 3300 KJ, or 0.91 kWh.

Suitable sources of RF for drying for use in a process according to the invention include any source capable of generating RF energy. For example, an RF dryer used in a process of the invention may generate RF energy with either oscillator or amplifier technology, or by other suitable means. The configuration of the dryer may expose the polymer to RF energy by passing the polymer between parallel electrode plates or by other suitable means. An inert, dry carrier gas may also be passed over or around the polymer to aid in the removal of the cavitatable liquid vapors or any other undesired gases that might be present.

The drying step may also be conducted under reduced pressure to achieve drying at significantly reduced temperatures. Accordingly, the temperature of the purified polymer need not be raised but merely maintained by the RF energy to replace the heat lost by evaporation of the retained liquid. By this method, the possibility of overheating or destroying the polymer or fostering polymer runaway is reduced. Drying of the polymer at reduced temperatures also eliminates a long expensive cooling step and, further, the polymer can be processed immediately from drying to packout. Accordingly, a purified polymer can be dried by exposure to RF energy at a temperature which is lower than the boiling point of the retained liquid at atmospheric pressure.

The Recovery Step

In some cases it may be beneficial to recover the impurities from the leachate, i.e., the cavitatable liquid containing the extracted impurity. For example, unreacted monomers, catalysts, chain-length control agents, dyes, and the like may be recovered from the cavitatable liquid, recycled and then reused. According to the invention, after the purified polymer is separated from the leachate, the leachant may be recovered from the leachate by techniques known in the art such as, for example, by vacuum distillation, a multieffect evaporator, membrane separation, and freeze crystallization. In a preferred embodiment of the invention, the leachant is recovered from the cavitatable liquid by freeze crystallization. Freeze crystallization involves cooling the leachate to a temperature sufficient to solidify or freeze the cavitatable liquid with minimum incorporation of the leachant and then removing the frozen liquid by standard solid-liquid separation techniques (e.g., filtration, centrifugation). The unfrozen portion of the leachant contains a higher concentration of the extracted impurity, as determined by index of refraction methods as described above, which may then be recycled and reused. The use of freeze crystallization to separate an extracted impurity from the cavitatable consumes approximately half of the energy consumed by conventional evaporation or multi-effect evaporation techniques. Freeze crystallization can be achieved, for example, by means of static freezing as illustrated in Example 9 or by a scraped-surface heat exchanger as illustrated in Example 10. Other freeze concentration systems may be used including, but not limited to, those supplied by GEA-Niro, based in the Netherlands.

For example, treatment of polycaprolactam according to an ultrasonic leaching/extraction process of the invention results in the extraction of caprolactam monomer from the polymer. Once the cavitatable liquid, in this case water, containing the extracted caprolactam monomer is separated from the purified polymer, the water containing the caprolactam is then subjected to freeze crystallization. Under freeze crystallization conditions, at caprolactam concentrations up to approximately 50%, the liquid water freezes while the caprolactam monomer stays in the liquid solution. The frozen liquid can then be separated by, for example, filtration or centrifugation from the unfrozen caprolactam monomer solution which in turn can then be readily recycled and reused.

EXAMPLES

The practice of the invention is disclosed in the following examples, which should not be construed to limit the invention in any way.

General Methods and Procedures:

Index of Refraction (IR) Measurements: A Leica IFT10 Industrial Fluid Tester #7541 (obtainable from Cole-Parmer, Chicago Ill.) was used to determine the index of refraction (IR) of samples. This hand-held unit measures the IR on the solids Brix scale, in the range of 0–10% solids. Since it was originally intended for measuring sugar solutions, it was pre-calibrated utilizing known caprolactam solutions. The agreement between the known values and the measured IR values were within approximately 2% across the readable range and were subsequently used without further corrections.

Infrasonic Radiation: To illustrate the importance of cavitation to the overall extraction (leaching) rate, several extraction experiments were performed with a device which produced "infrasonic" vibrations in the extractant solution or cavitatable liquid. These vibrations produced considerable sonic streaming as evidenced by the violent agitation present in the solution. At the low frequencies produced by the device (approximately 900–1000 Hz), no cavitation was produced. The infrasonic energy was provided to the cavitatable liquid by a long (approximately 6 ft long, and 2 inches in diameter), strong metal rod which was driven at the top end in a circular vibration by an electric motor and an eccentric. The resulting vibration created a transverse vibration of the metal rod, similar to the vibration of a string of a musical instrument. Support of the vibrating metal rod without providing a damping action for the vibration was accomplished by placing a bearing at one of the node points of the vibration. The bottom end of the vertically placed rod underwent a vibrational displacement of $3/8$ to $1/2$ inch at a frequency near 1000 Hz.

Comparative Example 1

Leaching by Infrasonic versus Ultrasonic Radiation

Figure 6:
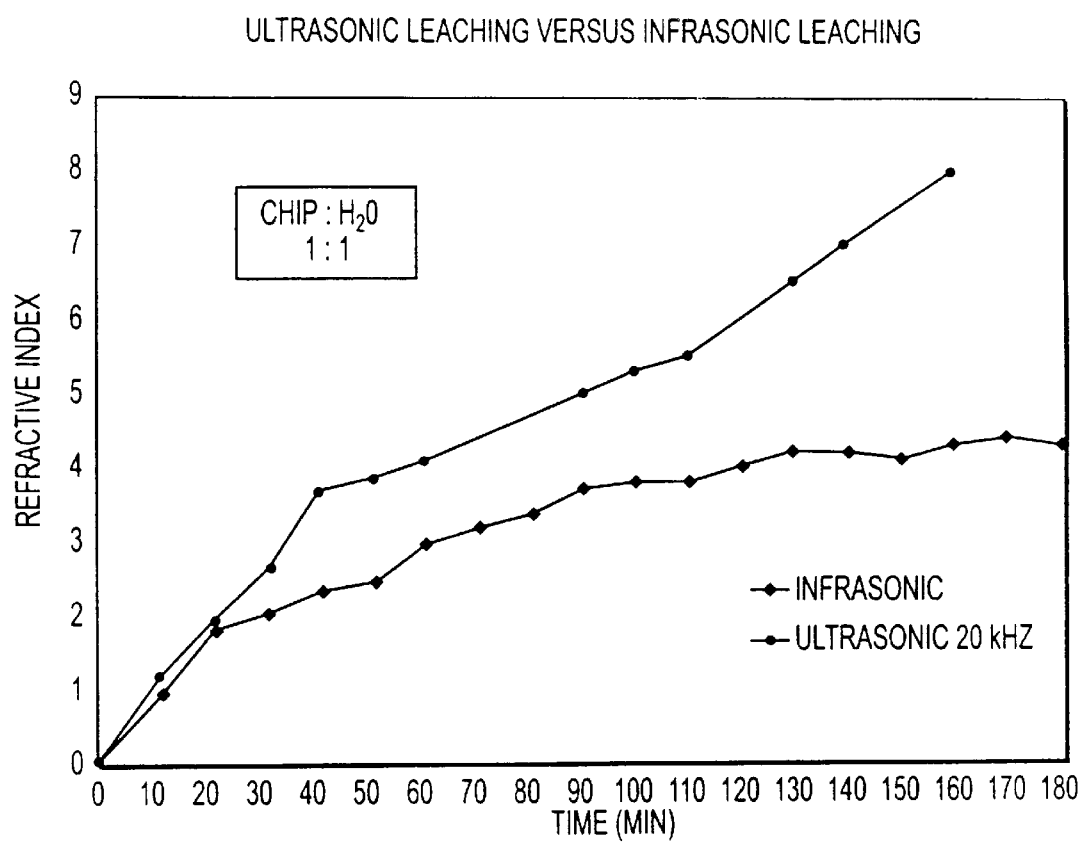
FIG. 6 illustrates the results of leaching by infrasonic versus ultrasonic radiation (Comparative Example 1).

Samples of unleached polycaprolactam CAPRON chips (commercially available from Allied Signal, New Jersey) covered with distilled water (CAPRON:water was 1:1) were treated with, independently, ultrasonic and infrasonic radiation to effect leaching. The results are illustrated in FIG. 6. As described above, in contrast to ultrasonic radiation, infrasonic radiation produced little to no cavitation and consequently was less effective at leaching of impurities from the polycaprolactam.

Example 1

Leaching by Indirect Contact Between the Source of U/S Energy and the Polymer

Samples of 100 grams each of unleached polycaprolactam CAPRON (commercially available from Allied Signal of Morristown, New Jersey) were placed into 500 mL beakers, covered with 100 g of distilled water, and treated with ultrasonic (U/S) energy by suspending the beakers in the tanks of U/S cleaners provided by Branson Ultrasonics, Danbury, Conn. The temperature was controlled by thermostats supplied as part of the cleaner equipment. The tank temperature was maintained at 165° F.+/−10° F. At that temperature, some evaporation of the leaching water in the beakers was observed, so periodic additions of distilled water to maintain a constant water level in the beakers were made. The tanks provided U/S frequencies of 20, 25, 40 and 45 kHz. Some of the tanks were equipped with piezoceramic U/S drivers and one tank was equipped with an immersible magnetostrictive driver. The total U/S energy provided by the transducers was dispersed within the approximately 30 gallon volume of the tank. Because the U/S energy intensity was not dispersed uniformly throughout the tank, the beakers were placed in zones of differing U/S energy intensity. Additional variations in the U/S energy levels were evaluated based on the type of transducer (piezoceramic or magnetostrictive). The power level delivered to the whole tank in that experiment was 3000 watts by means of three (3) 1000 watt transducers. The power level delivered to the total volume of the cavitatable liquid also directly influenced the rate of extraction or leaching. The greatest overall leach rate was found in the sample which had the combination of greatest intensity, location directly in an antinode area, with the U/S radiation delivered by an immersible magnetostrictive transducer.

Figure 7:
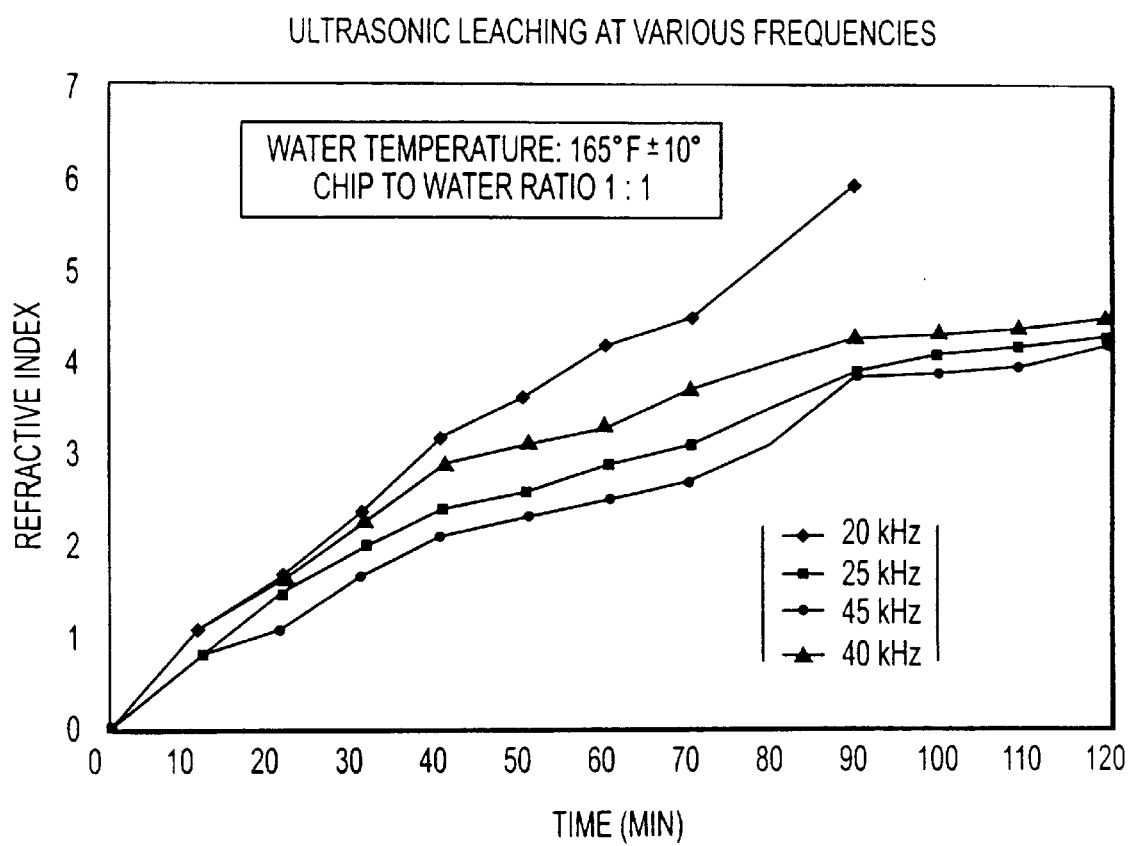
FIG. 7 illustrates the results of leaching by indirect contact between the source of U/S energy at various frequencies and the polymer (1).

Negligibly small samples (1–3 drops) of the leachate, i.e., cavitatable liquid and extracted impurity, were withdrawn at various times, and the refractive index or index of refraction (IR) values of each was determined. Since the weight of the cavitatable liquid water and the weight of the polymer chips were initially equal, an IR reading of, for example 5%, corresponds to a removal of an equal percentage (5%) of leachable material from the polymer. Relating that value to the total leachable material is thus simple. For example, assume that the total amount of leachable material is assumed to be 10% of the total weight of the unleached substantially unoriented polymer. Then a 5% IR reading corresponds to a removal of 5% of the total weight of the polymer, or 50% of the leachable material. Similarly, an IR reading of 7.5% corresponds to removal of 7.5 grams of the leachables, or 75% removal. The results of these extraction experiments are presented in FIG. 7.

Example 2

Leaching by Direct Contact Between the Source of U/S Energy and the Cavitatable Liquid and Polymer at High U/S Intensities A sample of 500 grams of Capron FD grade nylon chips was treated with a solution of 50 grams of caprolactam (CPL) crystals (commercially available from Aldrich Chemical Co., Milwaukee, Wis.) dissolved in 240 grams of distilled water. The wet suspension was stirred thoroughly and placed in a convection oven at 200° F. to dry. Periodically it was stirred mechanically to hasten the evaporation and to homogenize the mix. When the water had all been removed, the resulting nylon chips had a moist, glossy sheen containing the CPL deposited on their surfaces. These chips were then placed again in the oven and heated further at 200° F. to dissolve the CPL into the body of the chips. Completion was indicated by the loss of the gloss, and the finished chips had a dull white surface.

Using a Branson 2210 U/S cleaner fitted with a thermostat and heater, and which provides 90 Watts to an approximately 0.5 gallon bath, a 300 mL round-bottom flask was suspended to a depth so that over 75% of its volume was below the liquid bath level. Expanded polystyrene packing "peanuts" were floated on the surface of the bath water, enough so that adjacent peanuts were in contact with each other providing a single layer over the water. This produced an insulating layer over the water to stabilize the bath temperature and minimize evaporation from the bath. Then 50.0 grams of the CPL treated chips described above were placed in the round bottom flask, and allowed to warm to bath temperature. Simultaneously, 100.0 grams of distilled water was heated to the same temperature as the bath on a separate hot plate. The experiment was begun when the bath, the chips and the water were all at the same temperature, by pouring the water into the round-bottom flask, thus initiating the contact between the water and the chips.

Figure 8:
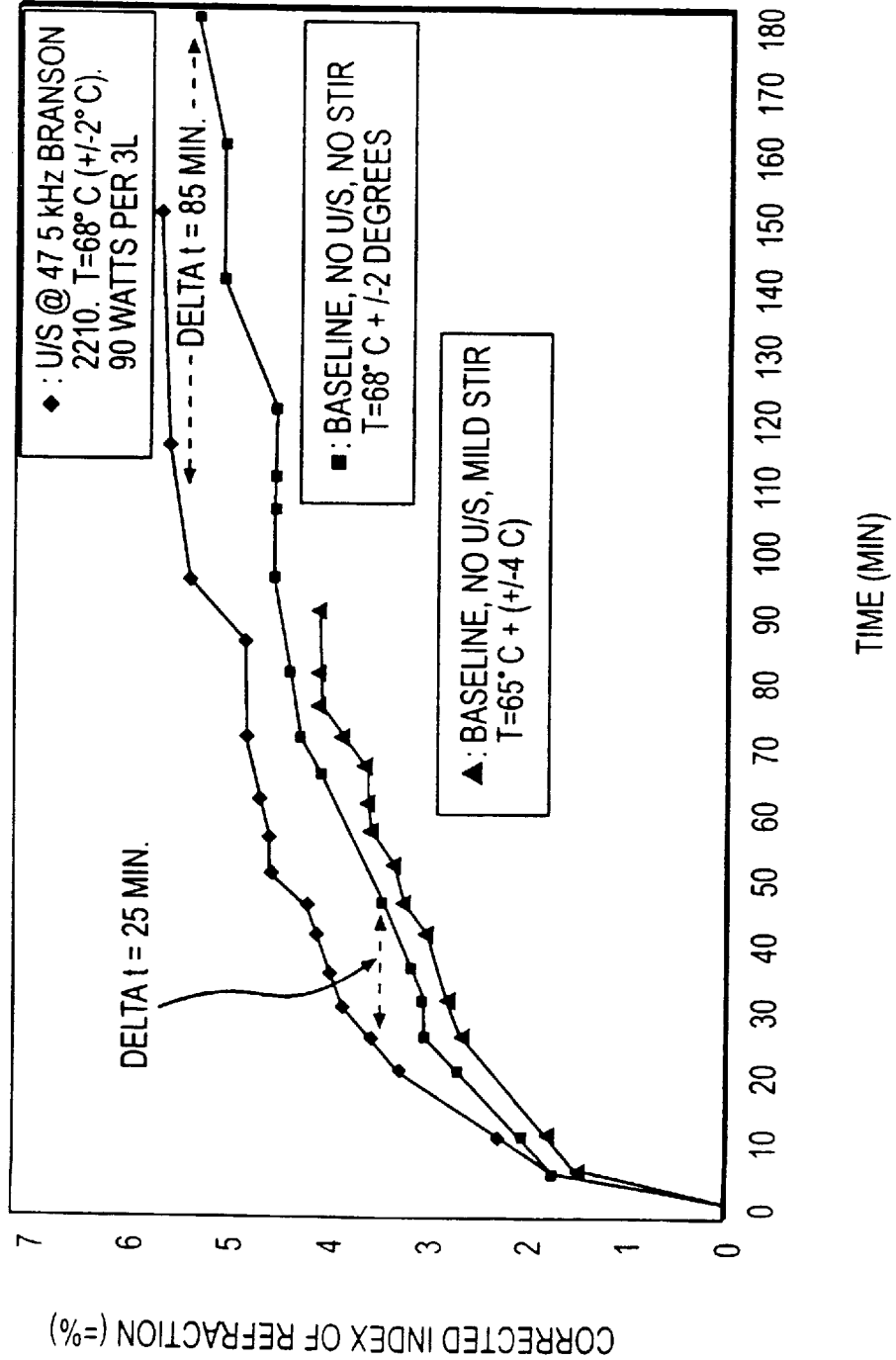
FIG. 8 illustrates the results of leaching by direct contact between the source of U/S energy and the cavitatable liquid and polymer at high U/S intensities (Example 2).

The baseline curve, shown in FIG. 8, was obtained as described above, with the thermostat and heater, but not the ultrasound active. The temperature was measured within the water bath. Since the thermostat did not provide accurate enough temperature control to maintain the desired +/−2 degrees C range, ice was added periodically to lower the bath temperature as needed. No form of stirring was provided other than the disturbances that occurred when samples were taken. Samples were withdrawn with some mild agitation using an eye-dropper. The volume of the eye-dropper was taken and expelled several times at each sample point to avoid getting non-representative samples, and CPL measured as described in Example 1.

The baseline with mild stirring was done in an identical fashion except that a thermocouple was placed within the stirred flask, and that a mechanically driven glass rod stirrer was added to the system. This stirrer entered the round-bottom flask through its neck, and its rotation (100–300 rpm) provided sufficient mild stirring action that the chips were kept in constant motion but were not experiencing a significant amount of vortex. Again the ultrasonic potion of the Branson unit was kept inactive. This stirred baseline is shown as the lowest curve on FIG. 8. The fact that it is slightly slower than the unstirred baseline rate is considered to be insignificant because the temperature was somewhat more difficult to maintain in that configuration, and the lower rate is likely to have resulted from a somewhat lower average temperature.

The upper curve was obtained by using the same configuration as the unstirred baseline, with the exception that the ultrasonic generator was switched on. Because of the heat generated by the application of the U/S energy to the bath, it was necessary to add ice to the bath more often, and remove some of the floating insulation peanuts from the surface to allow greater heat losses in order to maintain the temperature target. In this experiment, no external stirring other than that provided by the U/S energy was provided. Under those conditions, the extraction rates were significantly increased, as illustrated by the delta t values in Graph 3. Over the range of the experiment, it was clear that in the U/S driven extraction, the same levels of extraction were reached significantly sooner than either the baseline or the stirred baseline cases. Thus, for example, a time saving of 50% was seen in reaching the 3.5% extraction level. The 5.2% extraction level was reached in 54% of the time with U/S acceleration, compared to the baseline value.

Example 3

Figure 9:
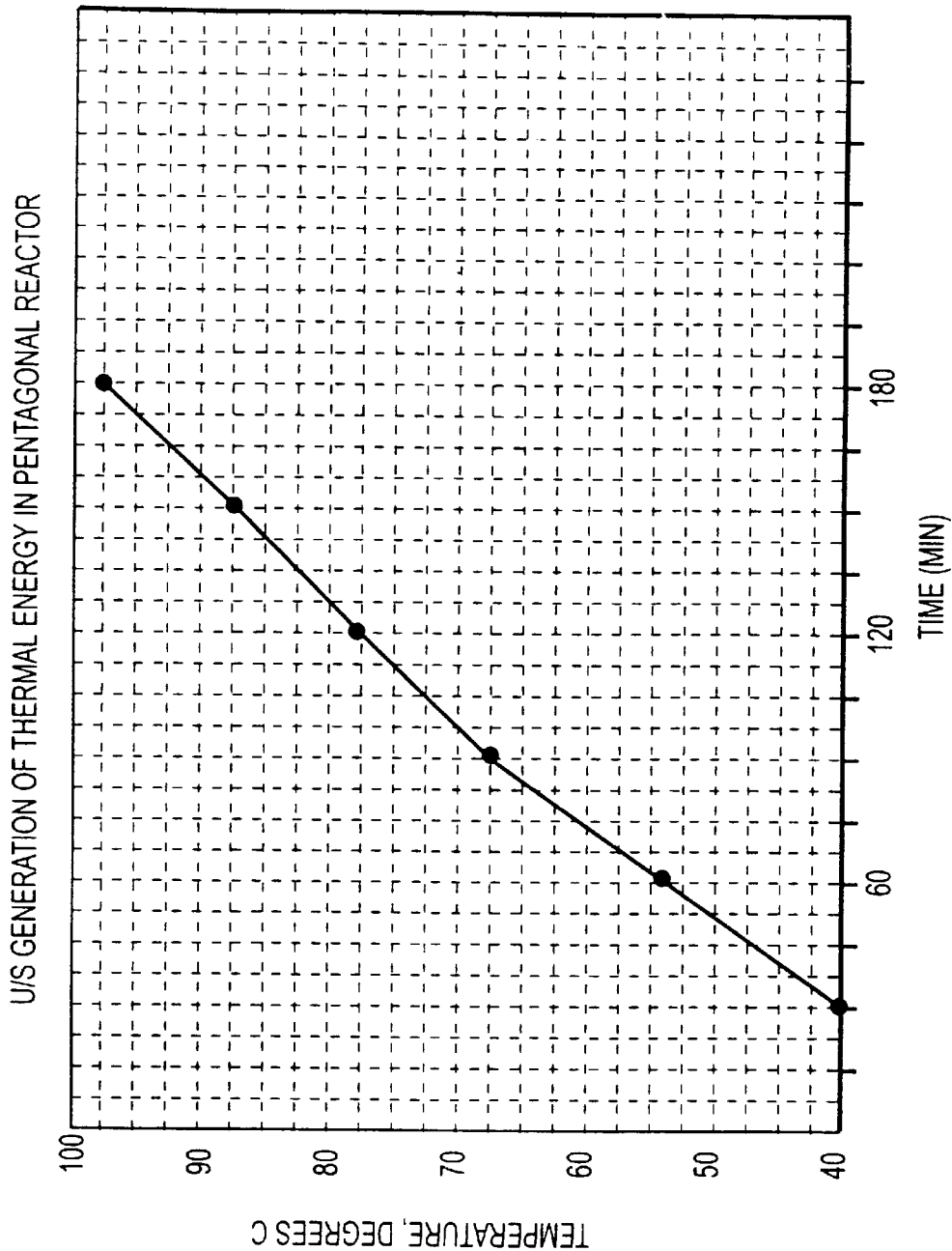
FIG. 9 illustrates a time and temperature profile for leaching by direct contact between the source of U/S energy and the cavitatable liquid and polymer at low U/S intensities (Example 3).
Figure 10:
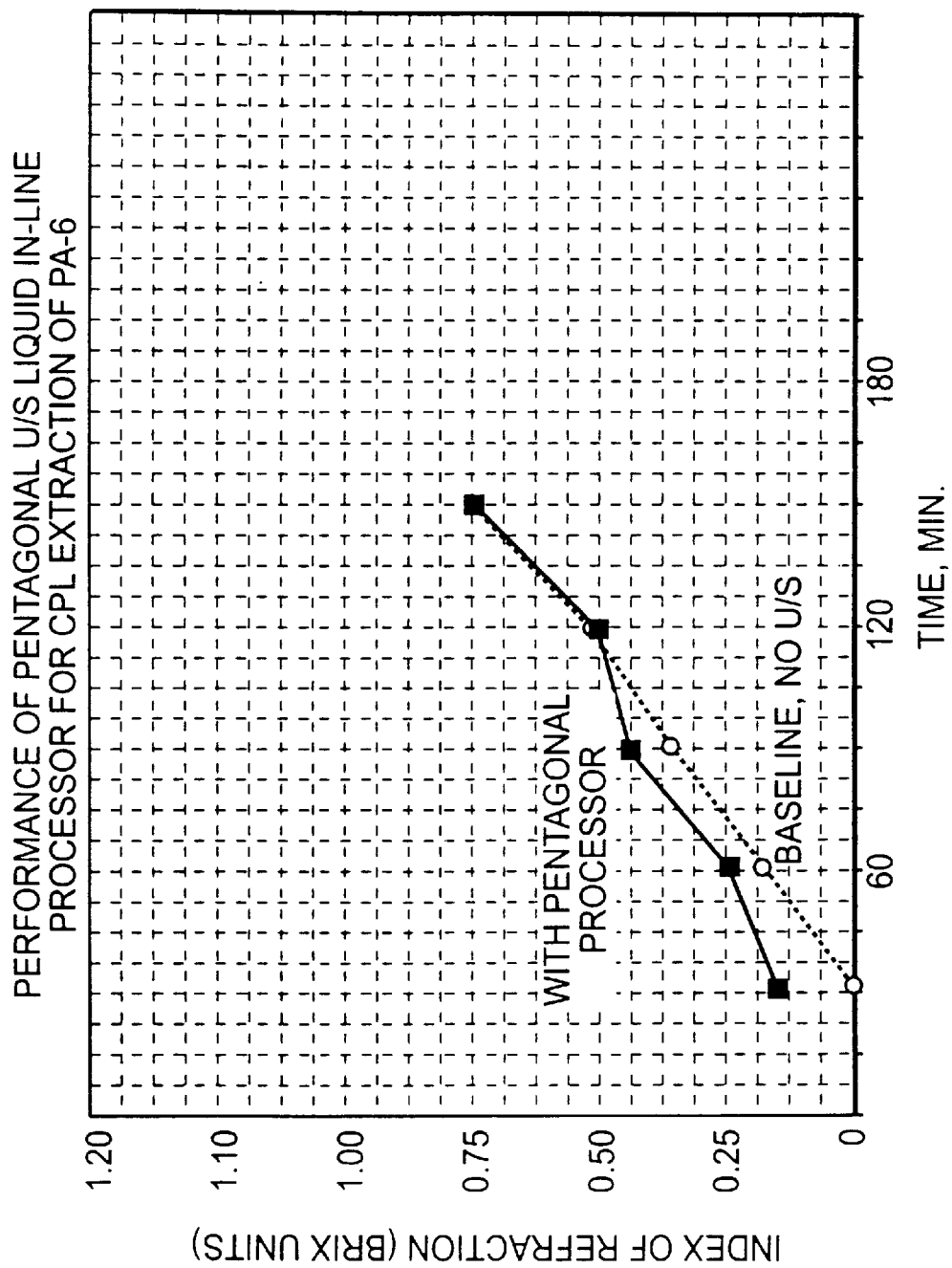
FIG. 10 illustrates the caprolactam concentration versus time data for leaching by direct contact between the source of U/S energy and the cavitatable liquid and polymer at low U/S intensities (Example 3).

Leaching by Direct Contact Between the Source of U/S Energy and the Cavitatable Liquid and Polymer at Low U/S Intensities A Branson Ultrasonics Pentagonal Liquid Processor, 30" long, and with 6.125" in the major diameter of the pentagonal cross section, powered by a 750 watt Ultrasonic driver at a frequency of 40 kHz, was fitted with a blind flange at the bottom and filled with unleached nylon chips. The remaining space of the liquid processor was filled with water The resulting chip:water ratio was 1.19 parts chip to 1 part water. The ultrasonic energy was applied to establish a time and temperature profile as shown in FIG. 9. Due to the difficulty of obtaining representative samples, the same water to chip ratio was placed in a one liter beaker and the same time and temperature profile was run. The caprolactam concentration (measured in terms of the index of refraction) versus time data that resulted is illustrated in FIG. 10.

Example 4

Figure 11:
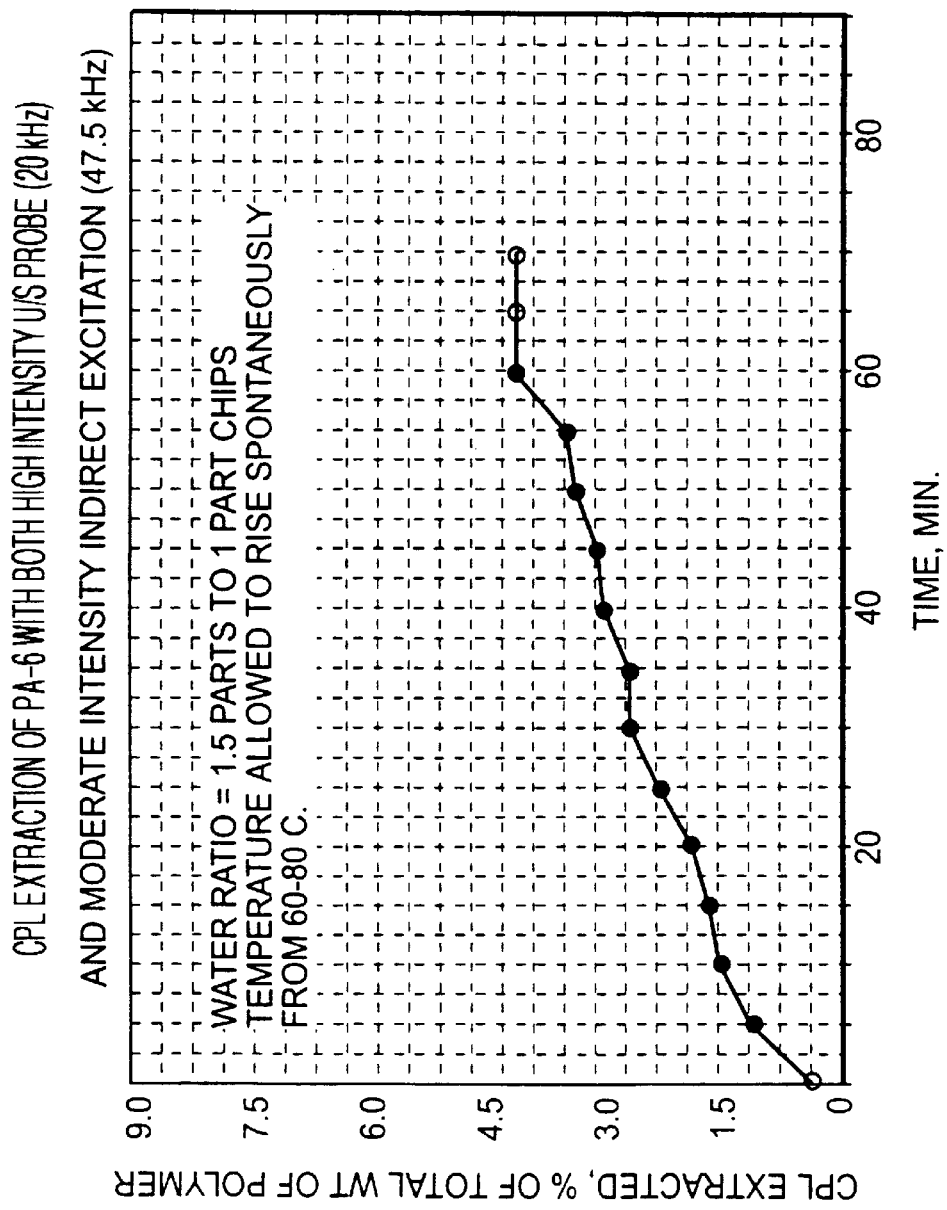
FIG. 11 illustrates the results of leaching by direct contact of the cavitatable liquid with the U/S driver, and simultaneous exposure of the whole system to U/S energy applied indirectly (Example 4).

Leaching by Direct Contact of the Cavitatable Liquid with the U/S Driver, and Simultaneous Exposure of the Whole System to U/S Energy Applied Indirectly As described in Example 2, a sonication flask was filled with 100 grams of unleached beads and 150 grams distilled water, and fitted with a water-cooled reflux condenser and sonicator as well as an internal thermometer placed in the water that was in direct contact with the chips. This entire assembly was then suspended in a second and external sonicator, a Branson 2210 U/S cleaner (Branson Ultrasonics, Danbury Conn.), which provided both a sonically active bath at 47.5 kHz and at a temperature of 69° C.+/−2° C. The results are shown in FIG. 11. Surprisingly, this combination of U/S excitations did not significantly improve the extraction rate relative to a control sample which used direct heating to perform the extraction.

Example 5

Indirect Ultrasonic Leaching of Polycaprolactam Chips

Figure 12:
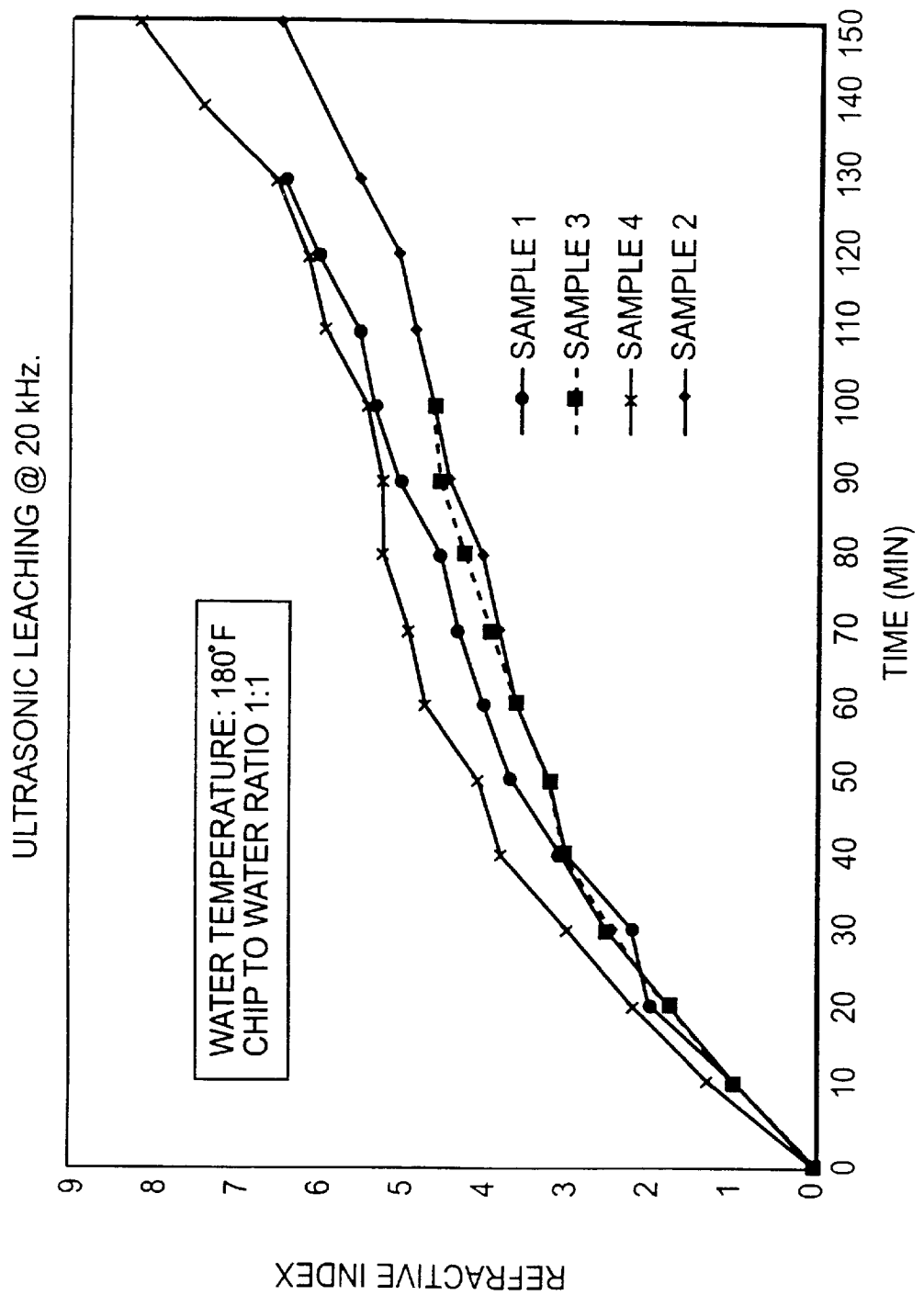
FIG. 12 illustrates the results of indirect leaching of polycaprolactam chips (Example 5).

Samples 1–4 of polycaprolactam CAPRON were placed in beakers and covered with distilled water. The resulting polycaprolactam to water ratio was 1:1. Each sample was placed at different areas of the sonicator tank filled with water and fitted with an immersed magnetostrictive transducer generating a frequency of 20 kHz. The temperature of the water was 180° F. Samples 1 and 3 were positioned at or near antinode areas while Samples 2 and 4 were positioned at or near node areas. The results are summarized in FIG. 12.

As can be seen, the leaching rate was a function of the intensity of the U/S energy. Even when samples were maintained at the same temperatures and excited with the same frequency of U/S, the extractions varied in rate, depending on the sample's placement within the U/S bath. From visual inspection of the surface of the various baths' cavitatable liquid, it could readily be determined where vibrational nodes and antinodes were located. The presence of an antinode was indicated by the presence of a very ruffled and vigorously agitated surface area. Nodes were at calm and unruffled areas. Generally, those beakers of chips of the polycaprolactam CAPRON placed at or very near a vibrational antinode within the tank were extracted at a significantly faster rate than those beakers found at nodes. Location between a node and an antinode produced moderate extraction rates.

Example 6

Figure 13:
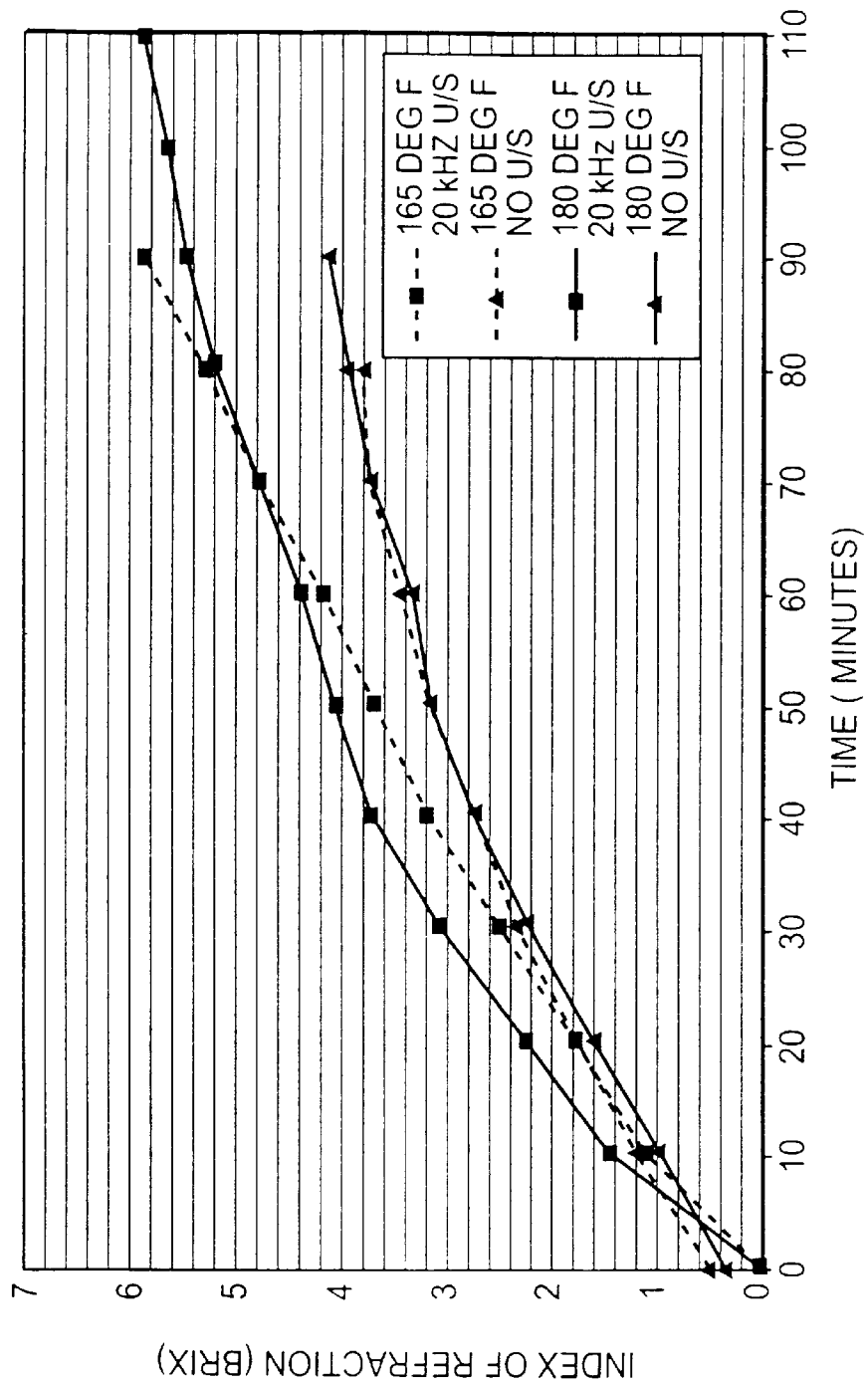
FIG. 13 summarizes the extraction rates of the non-ultrasound irradiated control extraction as compared to the ultrasonically irradiated extractions performed in Examples 1 and 5 at 20 kHz at 165° and 180° F. respectively (Example 6).

Comparison of Indirect Ultrasonic Leaching to Unstirred Leaching at the Same Temperature Of the ultrasonic frequencies used for extraction in Example 1, a frequency of 20 kHz proved to be the most effective frequency for extraction of caprolactam in this particular configuration of indirect ultrasonic irradiation. Concurrent with the ultrasonic extractions, controlled extractions were performed in heated water baths with identical temperatures and configurations as the ultrasonic extractions, only without ultrasonic irradiation. FIG. 13 summarizes the extraction rates of the non-ultrasound irradiated control extractions as compared to the ultrasonically irradiated extractions performed in Examples 1 and 5 at 20 kHz at 165° and 180° F. respectively. The ultrasonically irradiated extractions exhibited substantially increased rates of extraction of caprolactam. For example, the ultrasonically irradiated extraction at 180° F. achieved 3.75% extraction after 40 minutes, while the non-irradiated sample required approximately 72 minutes to reach the same level, meaning that the irradiated sample achieved the same level of extraction as the non-irradiated in 55% of the time.

Example 7

RF Drying of a Purified Substantially Unoriented Polymer

The polymer chips containing residual water will be introduced to a storage container or hopper just prior to being fed to a belt. The belt, driven by a pair of drive pulleys, will be constructed of a low-loss material such as woven polyester fiber with a silicone rubber coating and will move between the RF electrodes. As needed, the polymer chips will be fed onto the moving belt at such a rate as to produce a layer of appropriate depth on the belt. The optimum bed depth will vary with belt speed, polymer type and chip shape, with RF power level, and with moisture level. However, a typical bed depth will be about 10 cm. To produce a smooth, level bed, the chips will be passed under a doctor blade which creates a smooth, level chip bed. As the chips pass under the RF electrodes, the chips will be irradiated with RF energy to provide the heating level necessary to produce the desired level of dryness. To avoid the tendency to overheat the polymer and thus create a number of adverse effects, it is often advantageous to provide more than one RF electrode, which can have its operational parameters adjusted independently, so as to lower the amount of applied energy per unit time and area as the chips pass. After an appropriate residence time in the RF zone, the chips will pass over the end of the belt and pass down into the collection hopper to be cooled for shipping, or to be transported to another processing stage.

Example 8

Radio Frequency (RF) and Microwave (MW) Drying of a Purified Substantially Unoriented Polymer The procedure outlined in Example 7 will be followed except that a dual-irradiation apparatus will be used to provide both RF and MW energy. In addition, the RF power will be reduced to a level such that the combined irradiation levels will not produce overheating.

Example 9

Freeze Concentration of Leachate of Water and Caprolactam By Means of Static Freezing Each test solution was a solution of caprolactam (CPL, commercially available from Aldrich Chemical Corp. of Milwaukee, Wis.) in water prepared on a weight to weight basis. Thus, for example, a 40% caprolactam solution was prepared by dissolving 40 g caprolactam in 60 g distilled water. Static freezing was achieved by placing the test solution in an ordinary deep freeze, thermostated at $-10°$ F., until partially frozen. The ice-liquid mixture was then stirred to produce a slushy mixture as quickly as possible. The slushy mixture was then quickly subjected to suction filtration. No attempt was made to improve the separation by washing the collected ice layer. The separated ice was then allowed to warm to room temperature, and weighed. The mother liquor from the suction filtration was collected, allowed to warm to room temperature, and then measured for its index of refraction. The results are summarized in Table 2:

TABLE 2

| Initial Conc CPL | Final CPL conc in mother liquor | CPL Conc in Melted, Unwashed, Suction Filtered Ice |
|---|---|---|
| 50% | 52% | 38.6% |
| 40% | 45% | 32% |
| 20% | 28% | 8.6% |
| 28% (liq from line 3) | 38% | 20% |

In each test solution, the water was the first component of the mixture to freeze. Therefore, the concentration of water in the frozen material was greater, while caprolactam (CPL) concentration was less. In the unfrozen portion of the solution, CPL concentration was high.

Example 10

Freeze Concentration of Leachate of Water and Caprolactam By Means of a Scraped-Surface Heat Exchanger A solution of 8% (w/w) caprolactam (CPL) was passed through a scraped-surface heat exchanger which was part of a Taylor slush machine (Model 450, commercially available from the Taylor company of Rockton, Ill.). The solution was agitated in the heated exchanger barrel until the slush was at a thickness (viscosity) that represented the practical limit of the machine. The resulting slush was removed and quickly centrifuged through a hand-powered centrifuge. The walls of the centrifuge were lined with a close-weave cheesecloth lining so that the unfrozen liquid could pass through the centrifuge walls but the ice was retained. The liquid that collected at the bottom of the "centrifuge" had a CPL concentration of 12.5%. The collected ice was quickly placed on a suction filter and rinsed with an amount of cold distilled water equal to approximately 3% of the mass of the ice. A small sample of the rinsed ice was allowed to melt and come to room temperature, and contained 0.1% CPL.

Example 11

Ultrasonic Leaching Using Recycled Cavitatable Liquid

In practical operation of a nylon extraction plant, the extraction water is reused as many times as possible. After a given quantity of water has extracted a sample of nylon, the water is still generally of lower concentration in CPL than are the unleached chips. This water, then, still has extraction power to be used, and thus is used again to contact chips in which the CPL concentration is significantly greater than that of the water. To simulate this multiple reuse of the water, an extraction experiment was performed as described in Example 1, the results of which are shown labeled as "First Wash Cycle" in FIG. 14. After 60 minutes of extraction with fresh distilled water, the CPL concentration had reached 4.5%. The chips were separated from that batch of water by centrifugation. Both the 4.5% water and the chips were saved for further use. The chips were placed in another beaker, and another batch of fresh, distilled water was added to give a water to chip ratio of 1:1, and the extraction continued at the same temperature, and the same U/S level. Extraction into this fresh water resumed at a rate shown by the curve labeled "Second Wash Cycle" in FIG. 14.

Meanwhile, the 4.5% CPL water from the previous extraction was placed with a new sample of nylon, again such that the water to chip ratio was 1:1. This mixture, too was returned to the same temperature and same U/S level, and the extraction continued. Ex of is new sample on nylon continued as shown by the curve labeled "Recycled Water" in FIG. 14. The lower starting point of that curve is caused by the dilution effect that resulted when the water to chip ratio was adjusted to 1:1. Some additional fresh water was added to compensate for the water that was retained on the original chips after centrifugation, and was "lost" to this portion of the experiment.

What is claimed is:

1. A process for purifying a substantially unoriented polymer containing an impurity comprising the steps of:

(i) contacting a substantially unoriented polymer containing an impurity with a cavitatable liquid;

(ii) subjecting the substantially unoriented polymer containing an impurity in contact with the cavitatable liquid to ultrasonic radiation at a frequency and intensity sufficient to extract the impurity from the substantially unoriented polymer to form a purified substantially unoriented polymer; and (iii) separating the purified substantially unoriented polymer from the cavitatable liquid containing the extracted impurity.

2. The process according to claim 1, wherein the substantially unoriented polymer is a condensation polymer or a polyolefin.

3. The process according to claim 2, wherein the substantially unoriented polymer is a condensation polymer selected from the group consisting of polyamides, polyesters, and polycarbonates.

4. The process according to claim 3, wherein the condensation polymer is a polyamide selected from the group consisting of poly[imino(1-oxo-1,6-hexanediyl)], poly[imino(1,6-dioxo-1,6-hexanediyl)imino-1,6-hexanediyl], poly[imino-1,6-hexanediylimino(1,12-dioxo-1,12dodecanediyl)], and mixtures thereof.

5. The process according to claim 1, wherein the substantially unoriented polymer is in the form of a pellet, a chip, a fiber, or a sheet.

6. The process according to claim 1, wherein the cavitatable liquid is selected from the group consisting of water, alcohols, ketones, esters, ethers, dimethyl sulfoxide, aliphatic or aromatic hydrocarbons, supercritical fluids, liquids that are solid at room temperature but liquid at temperatures at which the process is conducted, and mixtures thereof.

7. The process according to claim 6, wherein said cavitatable liquid further comprises an additive selected from the group consisting of surfactants, wetting agents, anti-foaming agents, and vapor pressure/boiling point modifiers and mixtures thereof.

8. The process according to claim 6, wherein the cavitatable liquid is water.

9. The process according to claim 1, wherein the cavitatable liquid has a viscosity below about 10,000 centipoise units and a boiling point above about 50° C. at atmospheric pressure.

10. The process according to claim 1, wherein the process is conducted at a pressure greater than atmospheric pressure and the cavitatable liquid has a boiling point below about 50° C.

11. The process according to claim 1, wherein the frequency of ultrasonic radiation sufficient to extract the impurity from the substantially unoriented polymer is from about 15 to about 100 kHz.

12. The process according to claim 11, wherein the source of ultrasonic radiation is a transducer.

13. The process according to claim 12, wherein the transducer is selected from the group consisting of piezoelectric or inverse piezoelectric effect devices and magnetostrictive devices.

14. The process according to claim 12, wherein the ultrasonic radiation is applied continuously or intermittently.

15. The process according to claim 14, wherein the ultrasonic radiation is applied directly.

16. The process according to claim 14, wherein the ultrasonic radiation is applied indirectly.

17. The process according to claim 11, wherein the cavitatable liquid is substantially static and free-standing.

18. The process according to claim 11, wherein the cavitatable liquid is substantially dynamic and flowing.

19. The process according to claim 11, wherein the ultrasonic radiation is applied at an intensity ranging from 1 $W/cm^2$ to 500 $W/cm^2$ and a power of about 500–3000 Watts; and the process is conducted at a temperature ranging from about 35° C. to about 180° C. and at a pressure ranging from about 1 to about 5 atm.

20. The process according to claim 1, wherein said purified substantially unoriented polymer contains less than about 5% impurity based on the total weight of the substantially unoriented polymer.

21. The process according to claim 1, further comprising, after said separating step, the step of recovering the extracted impurity from the cavitatable liquid.

22. The process according to claim 21, wherein said recovery step comprises at least one of the following techniques: vacuum distillation, multieffect evaporation, membrane separation, and freeze crystallization.

23. The process according to claim 22, wherein said technique is freeze crystallization.

24. The process according to claim 23, wherein said freeze crystallization is achieved by static freezing or by means of a scraped-surface heat exchanger.

25. The process according to claim 1, further comprising, after said separating step, the step of drying the purified substantially unoriented polymer to remove any retained liquid.

26. The process according to claim 25, wherein said drying step comprises exposing the purified substantially unoriented polymer to sufficient low radio frequency energy to substantially remove any retained liquid.

27. The process according to claim 26, wherein the radio frequency is less than about 600 MHZ.

28. The process according to claim 26, wherein said drying step further comprises exposing the purified substantially unoriented polymer to microwave energy.

29. A purified substantially unoriented polymer prepared by the process according to claim 1.

30. A purified substantially unoriented polymer according to claim 29, wherein said purified substantially unoriented polymer is poly[imino(1-oxo-1,6-hexanediyl)] and comprises less than about 5% residual caprolactam monomers, based on the total weight of the substantially unoriented polymer.

31. A purified substantially unoriented polymer according to claim 30, wherein said poly[imino(1-oxo-1,6-hexanediyl)] comprises less than about 1% residual caprolactam monomers, based on the total weight of the substantially unoriented polymer.

* * * * *